Figure 10:
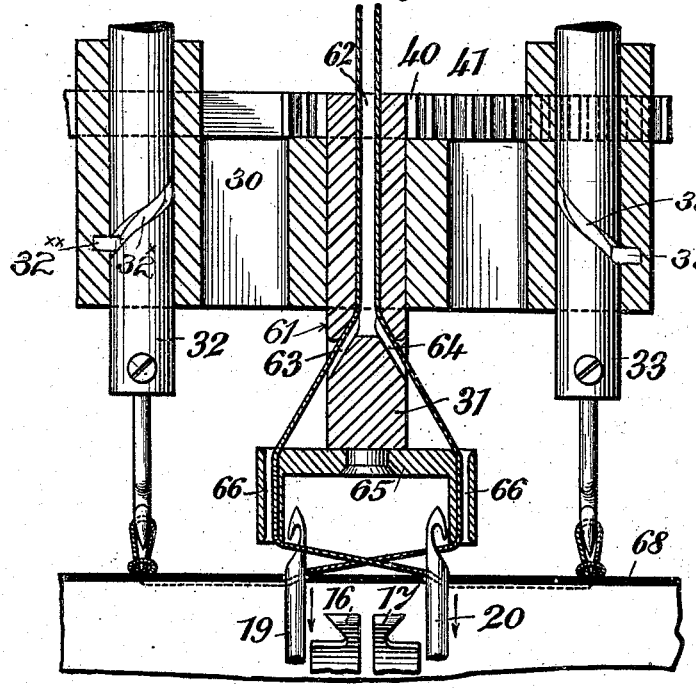

F. KUGLER.
BOOK STITCHING MACHINE.
APPLICATION FILED JUNE 6, 1907.
936,643.
Patented Oct. 12, 1909.
4 SHEETS—SHEET 1.
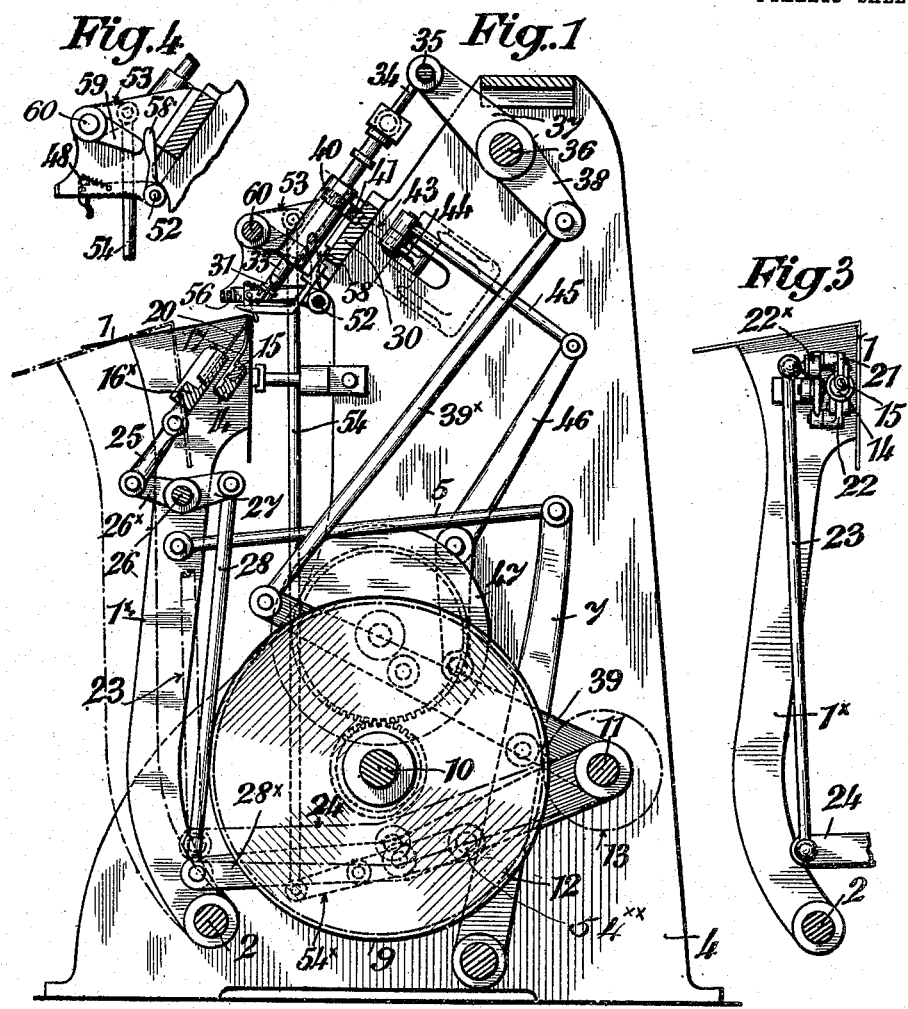
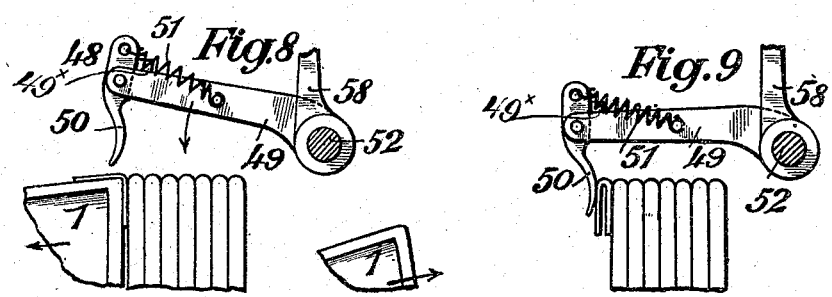
Witnesses:
Inventor:

F. KUGLER.
BOOK STITCHING MACHINE.
APPLICATION FILED JUNE 6, 1907.
936,643.
Patented Oct. 12, 1909.
4 SHEETS—SHEET 2.
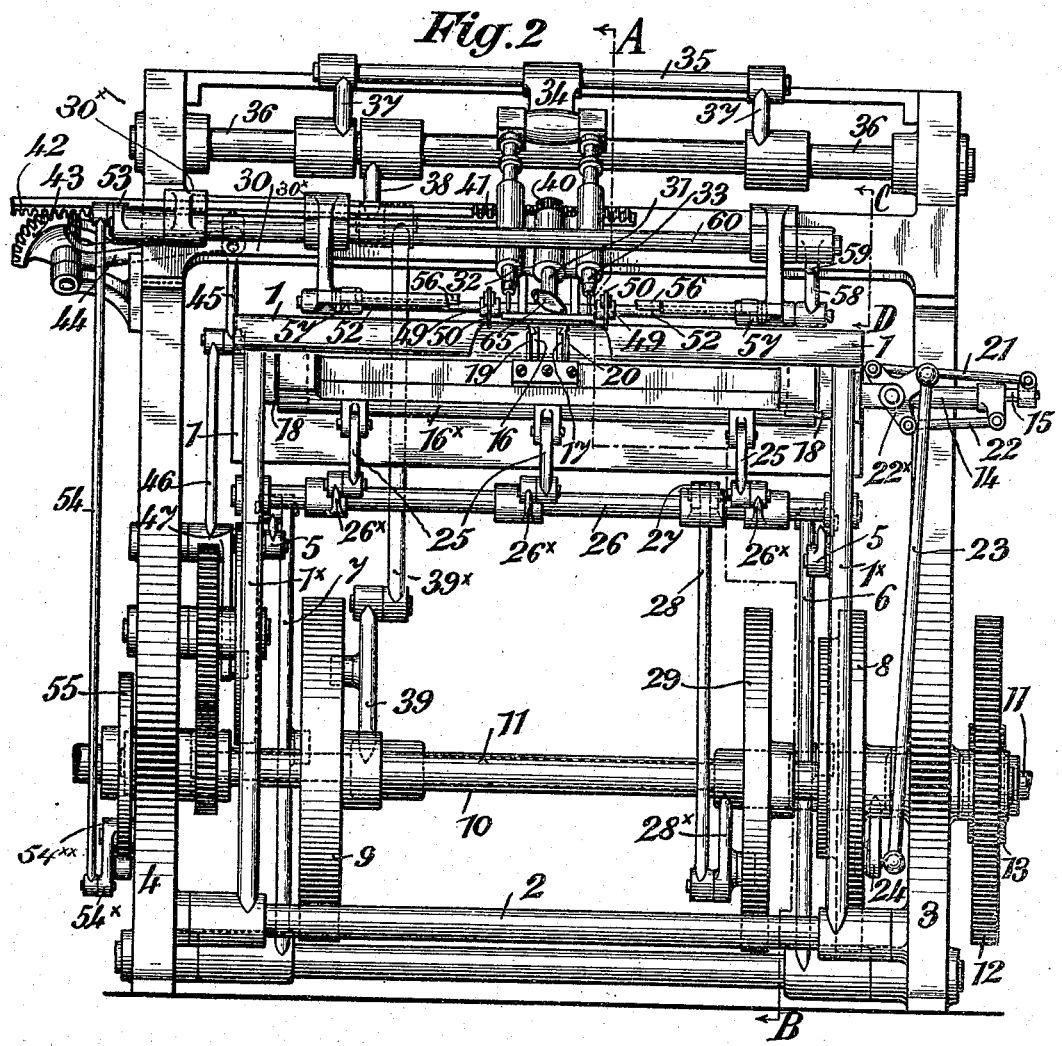
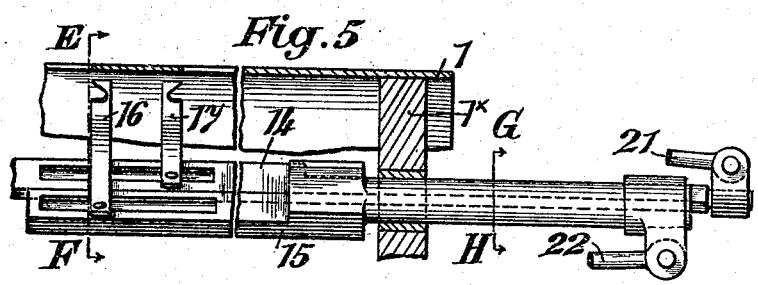
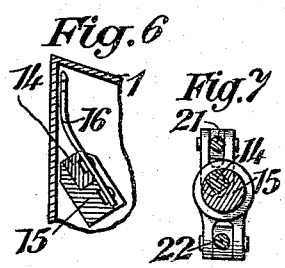
Witnesses:
Inventor:

F. KUGLER.
BOOK STITCHING MACHINE.
APPLICATION FILED JUNE 6, 1907.

936,643.

Patented Oct. 12, 1909.
4 SHEETS—SHEET 3.

Witnesses:
E. O. Hildebrand
M. Taylor

Inventor:
Friedrich Kugler
by George Massie
Attorney

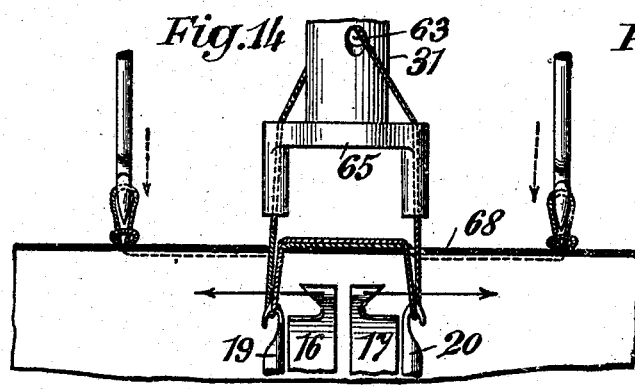
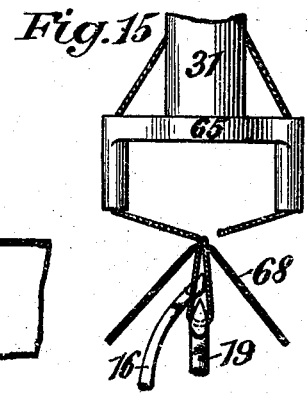
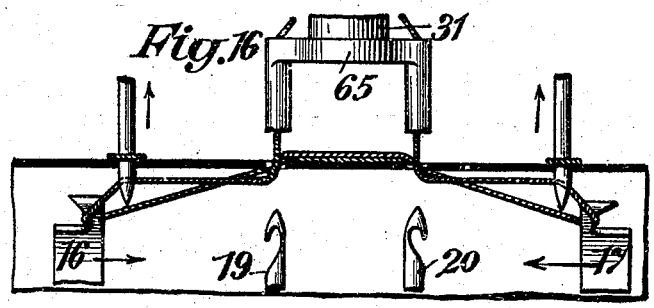
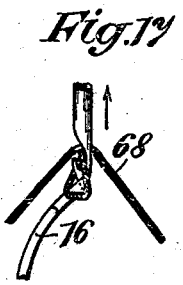
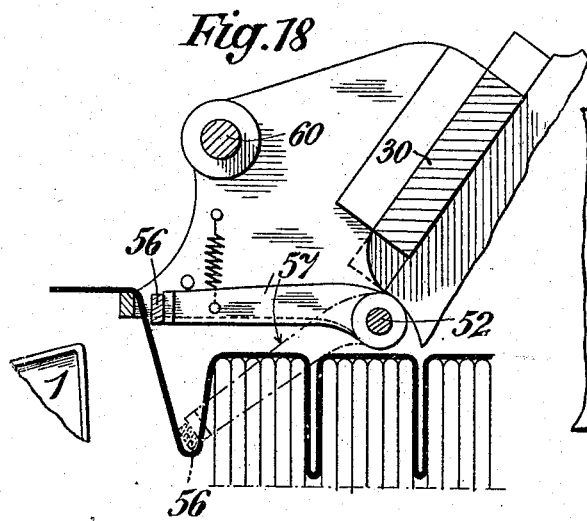
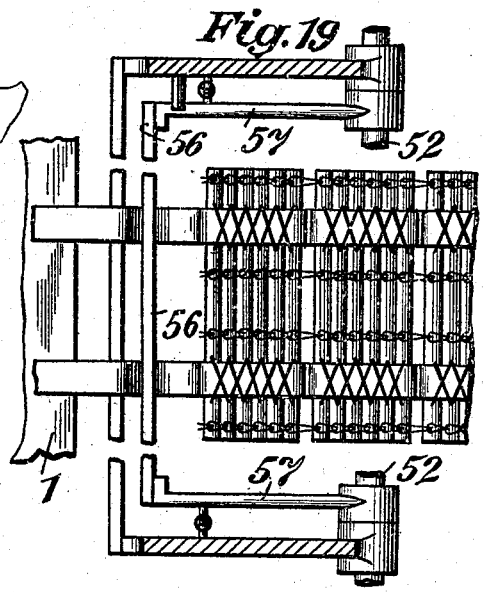

UNITED STATES PATENT OFFICE.

FRIEDRICH KUGLER, OF FRAUENFELD, SWITZERLAND, ASSIGNOR, BY MESNE ASSIGNMENTS, TO MARTINI-BUCHBINDEREI- & TEXTILMASCHINENFABRIK, A. G., OF FRAUENFELD, SWITZERLAND.

BOOK-STITCHING MACHINE.

936,643.     Specification of Letters Patent.     Patented Oct. 12, 1909.

Application filed June 6, 1907. Serial No. 377,632.

*To all whom it may concern:*

Be it known that I, FRIEDRICH KUGLER, a subject of the Emperor of Germany, and a resident of Frauenfeld, in Switzerland, have invented certain new and useful Improvements in Book-Stitching Machines; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

Machines for stitching books with thread wherein, for the production of a cross and chain stitch, four needles are arranged above the article to be stitched, are known.

The object of this invention is to provide a book-stitching machine in which the arrangement of needles is simplified.

The accompanying drawing shows one construction of machine embodying my invention.

Figure 1 of such drawings is a vertical transverse section corresponding to the lines A—B of Fig. 2. Fig. 2 is a front elevation. Fig. 3 shows parts of the machine in side elevation, Fig. 4 is a section corresponding to the line C—D of Fig. 2, Fig. 5 shows portions of the operating devices on an enlarged scale, Fig. 6 is a section corresponding to the line E—F of Fig. 5, Fig. 7 is a section corresponding to the line G—H of Fig. 5. Figs. 8 to 19 are views illustrating the mode of operation of the machine.

In the machine so represented 1 designates a stitching table of the type well known in book stitching machines of the kind under notice, and which is mounted to rock about an axle 2 between the two machine standards 3, 4. For the purpose of moving this table link rods 5 are pivoted to the carrying arms $1^x$ thereof and are connected to levers 6, 7, the movement of which is controlled by cams 8, 9. These cams are fixed upon a shaft 10 which is arranged perpendicularly to the standards 3 and supported in bearings therein and is driven from the driving shaft 11 of the machine through gearing 12, 13.

Beneath the stitching table 1 are three longitudinally arranged bars 14, 15, $16^x$, see Figs. 1, 2, 5, 6 and 7, the bars 14, 15 of which are guided on each other and are mounted to slide longitudinally in the carrying arms $1^x$ of the table 1. Each of the bars 14, 15 carries a turned up thread guide 16, 17 respectively. The bar $16^x$ is movable obliquely and perpendicularly to the longitudinal axis of the table 1 in guides 18 and is provided with upwardly extending hooked needles 19, 20.

For the purpose of moving the bars 14, 15 in a longitudinal direction they are connected by link rods 21, 22 to a three armed lever $22^x$ pivoted to the stitching table, see Figs. 2, 3 and 5; the lever $22^x$ is also connected by a link rod 23 to a lever 24 mounted to rotate about the shaft 11 and controlled by the cam 8.

For the purpose of moving the bar $16^x$ in the manner already mentioned rods 25 link the bar $16^x$ to levers $26^x$ fixed to a shaft 26 that is mounted in the table carrying arm $1^x$ parallel to the axle 2. Upon the shaft 26 there is also fixed a lever 27 which, by means of a link rod 28 is connected to a lever $28^x$ arranged to rock about the shaft 11. The lever $28^x$ is moved by a cam 29 fixed on the shaft 10.

Above the stitching table 1 and on a cross bar 30 connecting the two standards are mounted a rocking thread guide 31 arranged obliquely as shown, and two hooked needles 32, 33 between which the thread guide is located and which, like the thread guide, are arranged parallel to said thread guide and are by suitable mechanism, as shown, adapted to move up and down, the hooks of said needles being bent upwardly as shown. To move the hooked needles 32, 33 they are pivoted to one end of a rod 34 the other end of which is attached to an axle 35 carried by levers 37 which are fixed to a shaft 36 mounted in the machine standards parallel to the shaft 10. A lever 38 mounted upon the shaft 36 is connected by a link $39^x$ to a lever 39 arranged to rock or oscillate about the shaft 11 and moved by the cam 9. The hooked needles 32, 33 are also mounted to rock or oscillate about their axes; means for enabling this to be effected are indicated in Fig. 10 where $32^x$ and $33^x$ represent helical grooves in the shanks of the needles, 32 and 33, and $32^{xx}$ and $33^{xx}$ represent studs extending from the stationary needle sockets $30^x$ 30ˣ, which form part of the cross bar 30, into said helical grooves. It will be obvious, under this arrangement, that when the needles 32 and 33 descend, they rock or oscillate in one direction and on ascending they rock in the opposite direction. To effect the oscillation of the thread guide 31 the upper end thereof is provided with a toothed pinion 40 which gears into a rack 41 guided at 30ˣ. This rack is provided with a second set of teeth 42 into which gears a toothed segment 43 a lever-like extension 44 of which is connected by a link 45 to a lever 46 that is moved by a cam 47 rotated by gear wheels from the shaft 10.

48 are two bending and holding devices arranged above the stitching table 1 and each consisting of a lever 49 and a finger 50 mounted thereon, a spring 51 constantly pressing such finger against a stop 49ˣ. The levers 49 are fixed upon a shaft 52 mounted in the machine standards parallel to the shaft 10, and upon which is also fixed a finger 58 that lies against a finger 59, Figs. 1, 2 and 4, which is rigidly mounted upon a shaft 60. The shaft is also mounted in the machine standards parallel to the shaft 10 and, for the purpose of imparting a rocking motion thereto it has fixed to it a lever 53 which is moved by a cam 55 fixed upon the shaft 10, through a link 54 and a lever 54ˣ pivoted on a stud or spindle 54ˣˣ. Above the stitching table 1 is arranged a horizontal bar 56 running longitudinally thereof and which is carried by two lever arms 57 adapted to rock about the shaft 52.

Figure 11:
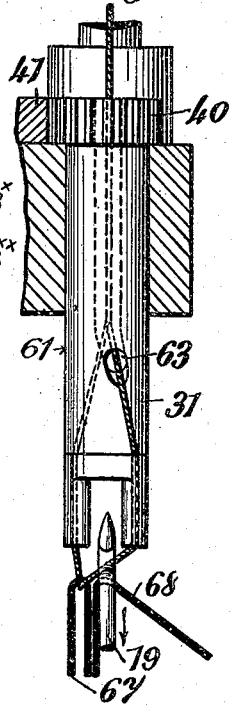
Figure 12:
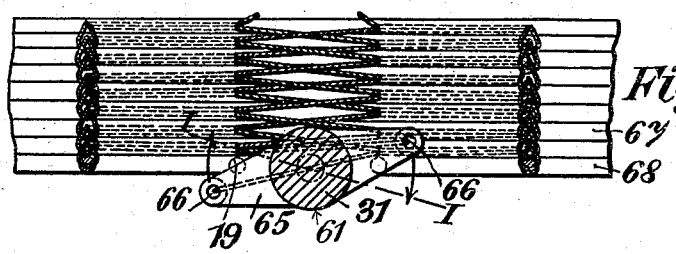
Figure 13:
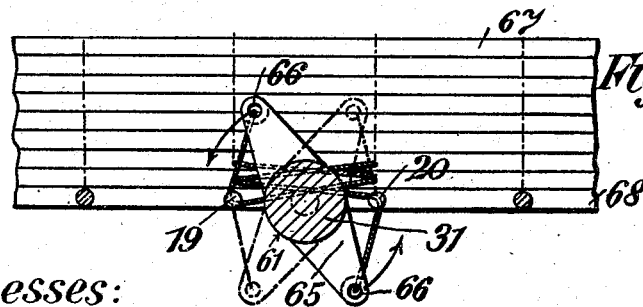

The thread guide 31 is formed with a stem 61, see Figs. 10 and 11, of which Fig. 10 shows the thread guide in vertical section and on a larger scale, and Fig. 11 in side view, which stem is bored longitudinally at 62 such boring at the top terminating directly in one orifice and at the lower portion in two obliquely descending borings 63, 64. The lower end of the thread guide is furnished with a cross head 65 formed with two perforations 66 lying opposite each other and equi-distant from the axis of rotation of the guide. 67 are sheets already stitched and 68 is a sheet to be stitched.

Before describing the mode of operation of the machine it is to be noted that Figs. 10 to 17 show the working of the thread guide, the lower hooked needles 19, 20 the upper hooked needles 32, 33 and the thread guides 16, 17, Figs. 8 and 9, the working of the bending and holding devices; and Figs. 18 and 19 illustrate the working of the bars 56.

The working of the improved book stitching machine is as follows: The sheet (68) to be stitched is laid upon the stitching table 1 when in its swung out position shown in dot and dash lines in Fig. 1. The table then moves into the position shown in full lines and thereby brings the sheet to be stitched into the position shown in Figs. 10 and 11. The hooked needles 19, 20 now pierce the sheet and move into the position shown in Figs. 10 and 11. The strings previously passed in the manner described through the borings 62, 63, 64 and 66 are now so laid around the hooked needles 19, 20, by rocking of the thread guide in the direction of the arrow shown in Fig. 12 into the position shown in Fig. 13, that on a subsequent downward movement of the bar 16ˣ the strings will be drawn into the position shown in Figs. 14, 15 through the hooks of the needles 19, 20. In order to make the operation of the rocking thread carrier 61 in laying the thread into engagement with the hooks of the needles 19 and 20, after each crossing of the threads, more certain and accurate the said needles are arranged on lines within the thread guides 66, 66 and the reciprocating mechanism for these needles is so arranged that these needles extend somewhat above the ends of the thread guides when rocking of the thread carrier occurs, as shown in Fig. 10. In order to still further increase the certainty of the hooks on the said needles 19 and 20, engaging the threads, the hooks, as shown, are arranged to face said thread guides, 66. By means of the hooked thread guides 17, 16 which move out of the position shown in Fig. 14 into the position shown in Fig. 16 the strings drawn by the needles 19 and 20 through the sheet 68 will be pulled into the position shown in Fig. 16. The hooked needles 32, 33 now pierce through the sheet to be stitched and rotate through an angle of 180° (Figs. 16 and 17) and on the ensuing upward movement the hooks of the needles 32, 33 draw the strings from the guides 16, 17 through the sheets to be stitched and pull them into loop form (Figs. 10 and 16). The stitching table then again moves outwardly into the position shown by dot and dash lines in Fig. 1, by which movement the sheet 68 is drawn off the stitching table. Another sheet is then laid upon the outwardly swung stitching table after which the stitching table moves again into the position shown in Fig. 1, for the purpose, (while thrusting back the sheet just stitched), of bringing the new sheet to be stitched, together with the sheets hanging thereto into the place of the sheet last stitched. The thread guide then moves out of the position shown in full lines in Fig. 13 into the position indicated in dot-and-dash lines in Fig. 12 (position I) by means of a rotation of more than 180°, in order to cross the threads. The hooked needles 19, 20 then pierce through the sheet to be stitched, and afterward the thread guide 31 moves out of the position I (shown in Fig. 12) into the position shown in dot and dash lines in Fig. 13 for the purpose of laying the strings in the hooks of the needles 19, 20. The hooked needles then move back again into the position shown in Fig. 14 for the purpose of pulling the strings through the sheets to be stitched. The strings are now pulled out as shown in Fig. 16 by the thread guides 16, 17, which in the meantime have returned to their original position, after which the hooks of the hooked needles, which in the meantime have been stuck through the new sheet to be stitched, draw, the strings out through the sheets into a loop on their backward movement. The sequence of operations is now repeated from commencement.

In the mode of working just described the sheets are stitched by cross and chain stitch, the cross stitch being the middle and a chain stitch on either side thereof.

In order, in the improved book stitching machines, to prevent the inset strips being crushed together by the sheets to be stitched after them, as happens in the known thread book stitching machines of this kind, the strip bending and holding devices are provided. After an inset strip or a sheet has been stitched, these devices move by the rocking of the shaft 52 in the direction of the arrow shown in Fig. 8 out of the position shown in Fig. 8 into the position shown in Fig. 9 and when an inset strip is stitched, fold it together as shown in Fig. 9. In this condition the inset strips are held by the strip holders until a sheet is again stitched, after which the strip holders are withdrawn from between the inset strip and the sheet last stitched, which is accomplished by a backward rotation of the shaft 52. As the inset strip folds are laid together by the folding and holding devices and are held in this condition till the sheets are able to hold them, all crushing of the strips by the sheets is entirely avoided.

It will be noted from the above description that the transverse finger 50 constituting this inset strip folding and holding device is adapted to move in a path transverse to the path of movement of the work-support, 1, to and from the stitching mechanism and that it is yielding with respect to the work-support but unyielding with respect to the stitched sheets and inset. In other words, it moves forward with the work-support when the same moves toward the right into its operative position and therefore does not interfere with the forward feed to the right of the connected sheets as the work proceeds, but at the same time serves to hold the same in place when the table recedes to the left. It therefore, prevents the outer flap of the inset from rising and thereby being injured or crushed, holding it in its folded position until the next sheet is stitched thereto. This finger, 50, by its movement transverse to the movement of the work-support, also serves, in connection with said work table, to properly fold down the outer flap of said inset sheet as is apparent from an inspection of Figs. 8 and 9.

If with the above described machine bands for the attachment of the book covers are to be simultaneously attached to the backs of the books, the bar 56 is arranged to provide the necessary band ends projecting beyond the books. Such bands are held by the crop stitches as Fig. 19 shows. In order to simplify the drawing, only one thread guide 31 has been shown, while the book stitching machine should have two thread guides 31 for stitching the two bands of the Fig. 19. When the last sheet of a book is stitched and the stitching table is swung inwardly, this bar is swung, by hand, out of the position shown in full lines in Fig. 18 into the dot and dash position, whereby the bands which were previously guided obliquely upward by the stitched book, are thrust loopwise between the book last stitched and the stitching table as shown in Fig. 18. After this has been accomplished the bar 56 is moved back again into its original position after which the first sheet of the next book can be stitched. There now remains between each two books loops formed by the bands which are of the necessary length to form the band ends and serving for the attachment of the book covers.

The above described method for providing the necessary band ends projecting beyond the books is considerably simpler than the methods now known, in which the books have either to be separated from each other by double the length of such a band end, which occupies much room, or the bands have to be subsequently drawn up to and through all the books and suitably cut off.

Having now particularly described and ascertained the nature of my said invention and in what manner the same is to be performed, I declare that what I claim is:

1. In a stitching machine, the combination, with a work-support and a pair of reciprocating hooked needles on one side of said support, of a rocking thread-carrier on the opposite side of said support and having thread-guides in proximity to the path of said needles, means for drawing the thread outward to both sides of said thread-carrier, and reciprocating loop-catching needles arranged on the same side of the work support as the rocking thread carrier and on both sides of said thread-carrier and near the extremity of the path of said means for drawing the thread outward.

2. In a stitching machine, the combination, with a work-support, a pair of hooked needles arranged below the same, and means for elevating and lowering said needles, of a rocking thread-carrier having downwardly extending thread-guides in proximity to the path of said needles, a pair of hooked thread-guides below the support arranged to reciprocate transversely to the path of the said needles, and a pair of reciprocating loop-catching needles arranged on each side of the thread-carrier above the said support and arranged to periodically pass below the same.

3. In a stitching machine, the combination, with a work support, a pair of reciprocating hooked needles arranged below the same, a rocking thread-carrier on the opposite side of said support having thread-guides in proximity to the path of said needles, means for drawing the thread outward to both sides of said thread-carrier, and a pair of reciprocating loop-catching needles arranged on both sides of the thread-carrier above the said support and arranged to periodically pass below the same.

4. In a stitching machine, the combination, with a work-support and a pair of reciprocating hooked needles on one side of said support, of a rocking thread-carrier on the opposite side of said support and having thread-guides in proximity to the path of said needles, means for drawing the thread outward to both sides of said thread-carrier, and reciprocating and axially oscillating loop-catching needles arranged at both sides of said thread-carrier and near the extremity of the path of said means for drawing the thread outward.

5. In a stitching machine, the combination, with a work-support, a pair of hooked needles arranged below the same and means for elevating and lowering said needles, of a rocking thread-carrier having downwardly extending thread-guides in proximity to the path of said needles, a pair of hooked thread-guides below the support arranged to reciprocate transversely to the path of the said needles, and a pair of reciprocating and axially oscillating loop-catching needles arranged on each side of the thread-carrier above the said support and arranged periodically to pass below the same.

6. In a stitching machine, the combination, with a work support, of an oscillating thread carrier transverse to and on one side of said work support and provided with two thread guides, of two hooked needles on the opposite side of the work support, arranged on substantially diametrically opposite sides of the axis of motion and within the paths of movement of said thread guides, means for reciprocating the hooked needles to and from a position above and between the ends of the thread-guides, and means for rocking the thread carrier when the needles are in said position.

7. In a book stitching machine, means for securing an attachment band to a series of sheets and a guide strip for said band mounted on the machine frame, in combination with a bar mounted to oscillate in the machine frame and adapted to be forced against the band to form the same into a loop at the end of a series of stitched sheets.

8. In a book stitching machine, a stitching mechanism for connecting sheets and insets to said sheets, and a work-support adapted to reciprocate to and from the stitching mechanism, in combination with a vibratory arm provided with a yielding finger at its end, said arm being adapted to vibrate in a path transverse to the path of the work-support.

9. In a book stitching machine, a stitching mechanism for connecting sheets, and insets to said sheets, and a work-support adapted to reciprocate to and from the stitching mechanism, in combination with a vibratory arm provided with a transverse finger at its end and adapted to vibrate transversely to the path of the work-support, and means permitting the finger to yield in the direction in which the stitched sheets are fed and to cause it to be unyielding in the opposite direction, whereby the sheets and insets are fed forward by the work support as they are stitched and are held in place when the work-support returns to its starting position.

In testimony that I claim the foregoing as my invention, I have signed my name in presence of two subscribing witnesses.

FRIEDRICH KUGLER.

Witnesses:
ERNST FISCHER,
A. LIEBERKNECHT.